United States Patent
Kim et al.

(10) Patent No.: US 9,665,980 B2
(45) Date of Patent: May 30, 2017

(54) GRAPHICS PROCESSING UNIT, METHOD OF OPERATING THE SAME, AND DEVICES INCLUDING THE SAME

(71) Applicant: SAMSUNG ELECTRONICS CO., LTD., Suwon-si, Gyeonggi-do (KR)

(72) Inventors: Seok Hoon Kim, Suwon-si (KR); Yong Ha Park, Seongnam-si (KR); Chang Hyo Yu, Yongin-si (KR); Kil Whan Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 338 days.

(21) Appl. No.: 14/447,883

(22) Filed: Jul. 31, 2014

(65) Prior Publication Data
US 2015/0042650 A1 Feb. 12, 2015

(30) Foreign Application Priority Data
Aug. 12, 2013 (KR) .................. 10-2013-0095160

(51) Int. Cl.
*G06T 15/30* (2011.01)
*G06T 17/20* (2006.01)
*G06T 17/30* (2006.01)
*G06T 15/10* (2011.01)
*G06T 15/00* (2011.01)

(52) U.S. Cl.
CPC .............. *G06T 17/30* (2013.01); *G06T 15/005* (2013.01); *G06T 15/10* (2013.01); *G06T 17/20* (2013.01)

(58) Field of Classification Search
CPC .......... G06T 15/10; G06T 17/20; G06T 17/30; G06T 17/005
See application file for complete search history.

(56) References Cited

U.S. PATENT DOCUMENTS

| | | | |
|---|---|---|---|
| 6,784,884 | B1 | 8/2004 | Hsieh |
| 7,570,267 | B2 | 8/2009 | Patel et al. |
| 8,144,147 | B2 * | 3/2012 | Munkberg ............. G06T 17/20 345/423 |
| 8,194,071 | B2 | 6/2012 | Meinds |
| 2009/0046098 | A1 | 2/2009 | Barone et al. |
| 2009/0237401 | A1 | 9/2009 | Wei et al. |
| 2009/0295798 | A1 | 12/2009 | Goel |
| 2011/0018874 | A1 | 1/2011 | Hasselgren et al. |
| 2011/0090224 | A1 | 4/2011 | Woo et al. |
| 2011/0102437 | A1 | 5/2011 | Akenine-Moller et al. |
| 2011/0267346 | A1 | 11/2011 | Howson |
| 2011/0310102 | A1 | 12/2011 | Chang |

(Continued)

*Primary Examiner* — Robert Craddock
(74) *Attorney, Agent, or Firm* — F. Chau & Associates, LLC

(57) ABSTRACT

A method of operating a graphics processing unit includes determining, based on input data, whether to perform a tiling operation before or after a tessellation operation and performing the tiling operation according to the determination result. Performing the tiling operation after the tessellation operation if the input data is not a patch, and if a geometry of the patch is at the out-side of a convex hull defined by control points of the patch. Performing the tiling operation after the tessellation operation if a geometry of a tessellated primitive corresponding to the patch changes according to a shading operation.

17 Claims, 9 Drawing Sheets

(56) References Cited

U.S. PATENT DOCUMENTS

| | | | |
|---|---|---|---|
| 2012/0081370 A1* | 4/2012 | Min | G06T 15/80 |
| | | | 345/426 |
| 2012/0086715 A1 | 4/2012 | Patel et al. | |
| 2014/0118364 A1* | 5/2014 | Hakura | G06T 11/40 |
| | | | 345/505 |

\* cited by examiner

GRAPHICS PROCESSING UNIT, METHOD OF OPERATING THE SAME, AND DEVICES INCLUDING THE SAME

CROSS-REFERENCE TO RELATED APPLICATIONS

This application claims priority under 35 U.S.C. 119(a) from Korean Patent Application No. 10-2013-0095160 filed on Aug. 12, 2013, the disclosure of which is hereby incorporated by reference in its entirety.

TECHNICAL FIELD

Embodiments of the inventive concept relate to a graphics processing unit (GPU), and more particularly, to a CPU for determining the order of a tessellation operation and a tiling operation based on input data and performing the tiling operation based on the determination result, a method of operating the same, and devices including the same.

DISCUSSION OF THE RELATED ART

A graphics processing unit (GPU) of a data processing system or of an application processor renders an image of an object to be displayed on a display. Recently, the CPU has been developed to perform a tessellation operation in the course of rendering the image of the object to provide the finer image of the object. Tessellation refines base patches into many triangles in order to visualize smooth curves/surfaces, where a patch is a curve/surface defined by control points and a parametric equation.

The GPU generates a plurality of primitives for the image of the object through the tessellation operation and stores data corresponding to the primitives in an external memory. The GPU needs to read and write a lot of data corresponding to the plurality of primitives in order to perform other operations after the tessellation operation, which causes an increase of the bandwidth of the data and an increase of the power consumption.

SUMMARY

According to some embodiments of the inventive concept, there is provided a method of operating a graphics processing unit. The method includes determining whether to perform a tiling operation before or after a tessellation operation based on input data and performing the tiling operation according to a determination result. The determining may include determining to perform the tiling operation after the tessellation operation when the input data is not a patch, when a geometry of the patch is at the out-side of a convex hull defined by control points of the patch, or when a geometry of a tessellated primitive corresponding to the patch changes according to a shading operation.

The determining may further include determining to perform the tiling operation before the tessellation operation when the input data is the patch, when the geometry of the patch is at the in-side of the convex hull, and when the geometry of the patch is preserved (not changed according to a shading operation.).

According to other embodiments of the inventive concept, there is provided graphics processing unit (GPU) including a pre-tiler configured to perform a tiling operation before a tessellation operation, a post-tiler configured to perform the tiling operation after the tessellation operation, and a control logic configured to control whether each of the pre-tiler and the post tiler performs the tiling operation based on input data. The control logic controls the post-tiler to perform the tiling operation after the tessellation operation when the input data is not a patch, when a geometry of the patch is at the out-side of a convex hull defined by control points of the patch, or when a geometry of a tessellated primitive corresponding to the patch changes according to a shading operation.

The control logic controls the pre-tiler to perform the tiling operation before the tessellation operation when the input data is the patch, when the geometry of the patch is at the in-side of the convex hull, and when the geometry of the patch is preserved (e.g., not changed by the shading operation).

The pre-tiler can be positioned (operatively connected) between a vertex shader and a hall shader. Alternatively, the pre-tiler can be positioned (operatively connected) between a hull shader and a tessellator.

According to further embodiments of the inventive concept, there is provided an application processor including the graphics processing unit (GPU) and a memory interface configured to transmit the input data from a memory to the graphics processing unit.

According to other embodiments of the inventive concept, there is provided a system on chip (SoC) including the graphics processing unit (GPU), a memory configured to store the input data, and a memory interface configured to transmit the input data from the memory to the graphics processing unit (GPU).

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of blocks may be exaggerated for clarity. Like numbers refer to like elements throughout.

It will be understood that when an element is referred to as being "connected" or "coupled" to another element, or between two elements, it can be directly connected or coupled to the other element or elements or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a" an and the are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art and/or the present application, and will not be interpreted in an idealized or overly formal sense unless expressly so defined herein.

BRIEF DESCRIPTION OF THE DRAWINGS

The above and other features of the inventive concept will become more apparent by describing in detail exemplary embodiments thereof with reference to the attached drawings in which.

DETAILED DESCRIPTION

Figure 1:
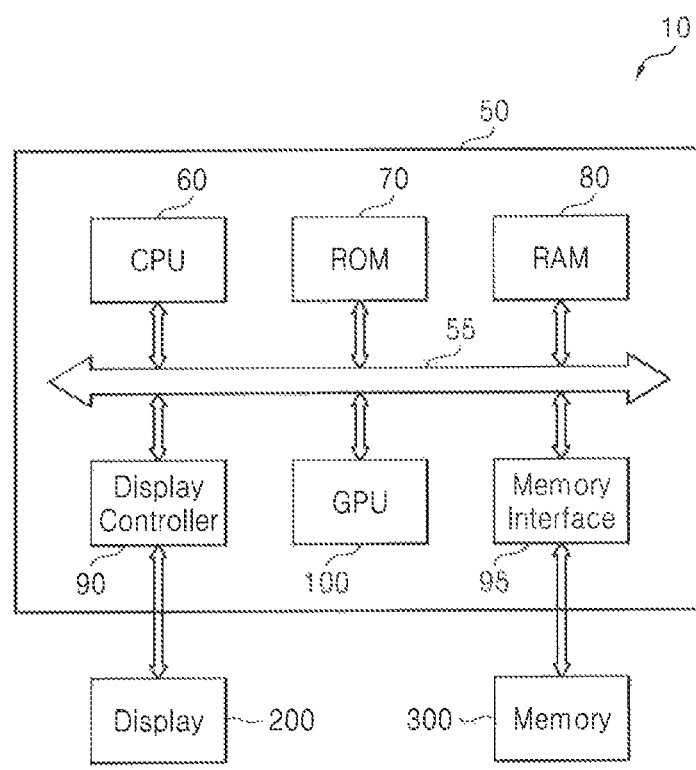
FIG. 1 is a block diagram of a data processing system including a graphics processing unit (GPU) according to an embodiment of the inventive concept.

FIG. 1 is a block diagram of a data processing system 10 including a graphics processing unit (GPU) 100 according to an embodiment of the inventive concept. Referring to FIG. 1, the data processing system 10 includes a data processing device 50, a display 200, and a memory 300.

The data processing system 10 can be implemented as a personal computer (PC), a portable electronic device (or mobile equipment), or an electronic device including the display 200 that can display image data. The portable electronic device may be a laptop computer, a cellular phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, a wearable computer, or an e-book.

The data processing device 50 controls the display 200 and/or the memory 300. In other words, the data processing device 50 controls the overall operation of the data processing system 10. For instance, the data processing device 50 determines whether to perform a tiling operation before or after a tessellation operation, based on input data received from the memory 300 and then performs the tiling operation according to the determination result.

In addition, the data processing device 50 determines whether to perform the tiling operation before or after the tessellation operation, based on the input data received from the memory 300 and a rendering state received from a central processing unit (CPU) 60 and then performs the tessellation operation according to the determination result. In other words, the data processing device 50 controls (or determines) the order of the tessellation operation and the tiling operation based on the input data received from the memory 300.

The data processing device 50 can be implemented in a printed circuit board (PCB) such as a motherboard, an integrated circuit (IC), or a system on chip (SoC). The data processing device 50 can be a processor or an application processor.

The data processing device 50 includes a CPU 60, a read-only memory (ROM) 70, a random access memory (RAM) 80, a display controller 90, a memory interface 95, and a GPU 100.

The CPU 60 controls the overall operation of the data processing device 50. For instance, the CPU 60 can control the operations of the components 70, 80, 90, 95, and 100. The CPU 60 communicates with the components 70, 80, 90, 95, and 100 through a bus 55. The CPU 60 reads and executes program instructions. For instance, programs and/or data stored in the memory 70, 80, and 300 can be loaded into an internal memory, e.g., a cache memory (not shown), of the CPU 60 under the control of the CPU 60.

In alternative embodiments, the CPU 60 can be implemented as a multiple-core processor. A multi-core is a single computing component with two or more independent cores.

The ROM 70 can permanently store programs and/or data. The ROM 70 can be implemented as erasable programmable ROM (EPROM) or electrically erasable programmable ROM (EEPROM).

The RAM 80 temporarily stores programs, data, and/or instructions. The programs and/or data stored in the memory 70 or 300 may be temporarily stored in the RAM 80 under the control of the CPU 60, the control of the GPU 100, or a booting code stored in the ROM 70. In other embodiments, the RAM 80 can be implemented as dynamic RAM (DRAM) or static RAM (SRAM).

The CPU 100 performs operations related with graphics processing to reduce the load of the CPU 60. The CPU 100 determines whether to perform a tiling operation before or after a tessellation operation, based on input data received from the memory 300 and then performs the tiling operation according to the determination result.

In other embodiments, the CPU 60 determines whether to perform a tiling operation before or after a tessellation operation, based on input data received from the memory 300 and generates a control signal (or control signals) according to the determination result. The GPU 100 performs the tiling operation corresponding to the determination result in response to the control signals) output from the CPU 60.

In addition, the GPU 100 determines whether to perform the tiling operation before or after the tessellation operation, based on the input data received from the memory 300 and a rendering state received from the CPU 60 and then performs the tiling operation according to the determination result.

The display controller 90 controls the operation of the display 200. For instance, the display controller 90 transmits image data, e.g., still image data, moving image data, three-dimensional (3D) image data or stereoscopic 3D image data, from the memory 300 to the display 200.

The memory interface 95 can function as a memory controller that can access the memory 300. For instance, the data processing device 50 and the memory 300 communicate with each other through the memory interface 95. In other words, the data processing device 50 and the memory 300 transmit data to and receive data from each other through the memory interface 95.

The display 200 displays an image corresponding to image data output from the display controller 90. The display 200 can be implemented as a touch screen, a liquid crystal display, a thin film transistor LCD (TFT-LCD), a light emitting diode (LED) display, an organic LED (OLED) display, an active matrix OLED (AMOLED) display, or a flexible display.

The memory 300 stores programs and/or data to be processed by the CPU 60 and/or the GPU 100. The memory 300 can be implemented as a volatile or non-volatile memory. The memory 300, as an external memory, may perform the function of a main memory.

The volatile memory can be implemented as DRAM, SRAM, thyristor RAM (T-RAM), zero capacitor RAM (Z-RAM), or twin transistor RAM (TTRAM). The non-volatile memory can be implemented as electrically erasable programmable ROM (EEPROM), flash memory, magnetic RAM (MRAM), spin-transfer torque MRAM (STT-MRAM), conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, molecular electronic memory device, or insulator resistance change memory.

The non-volatile memory can also be implemented as a flash-based memory device such as a secure digital (SD) card, a multimedia card (MMC), an embedded MMC (eMMC), a universal serial bus (USB) flash drive, or a universal flash storage (UFS). The non-volatile memory can also be implemented as a hard disk drive (HDD) or a solid state drive (SSD).

Figure 2:
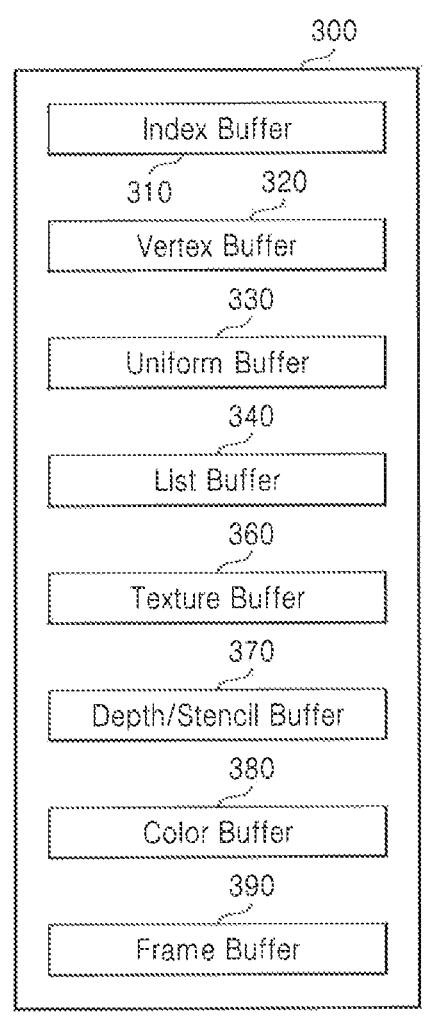
FIG. 2 is a schematic block diagram of the memory shown in the data processing system of FIG. 1.

FIG. 2 is a schematic block diagram of the memory 300 shown in the data processing system of FIG. 1. Referring to FIGS. 1 and 2, the memory 300 includes an index buffer 310, a vertex buffer 320, a uniform buffer 330, a list buffer 340, a texture buffer 360, a depth/stencil buffer 370, a color buffer 380, and a frame buffer 390.

The index buffer 310 stores an index of data stored in each of the buffers 320 through 390. For instance, the index may include attribute information such as the name and size of the data and position information about the position, e.g., in the buffers 320, 330, 340, 30, 370, 380, or 390, where the data is stored.

The vertex buffer 320 stores vertex data about attributes such as the position, color, normal vector, and texture coordinates of a vertex. The vertex buffer 320 can store tessellated vertex data about attributes such as the position, color, normal vector, and texture coordinates of a tessellated vertex resulting from the tessellation operation of the GPU 100. The vertex buffer 320 can store patch data (or control point data) about attributes such as the position and normal vector of each of control points included in a patch necessary for the tessellation operation of the GPU 100.

In other embodiments, the vertex data includes data about attributes such as the position, color, normal vector, and texture coordinates of each of vertices included in a primitive. For instance, the primitive may be a vertex, a line, isoline, or polygon.

In various embodiments, the vertex data may include patch data (or control point data) about attributes such as the position and normal vector of each of control points included in a patch. For instance, the patch may be defined by the control points and a parameter equation.

The uniform buffer 330 stores the constant(s) of a parametric equation defining a patch, e.g., a curve or a surface, and/or a constant for a shading program.

The list buffer 340 can store a list matching a tile resulting from the tiling operation of the GPU 100 with an index of data (e.g., vertex data, patch data, or tessellated vertex data) included in the tile.

The texture buffer 360 stores a plurality of texels in a form of tile. The depth/stencil buffer 370 can store depth data about the depth of each of pixels included in an image processed, e.g., rendered by the GPU 100, and stencil data about the stencil of each pixel.

The color buffer 380 stores color data about color for a blending operation performed in the GPU 100. The frame buffer 390 can store pixel data for image data) about a pixel finally processed by the GPU 100.

Figure 3:
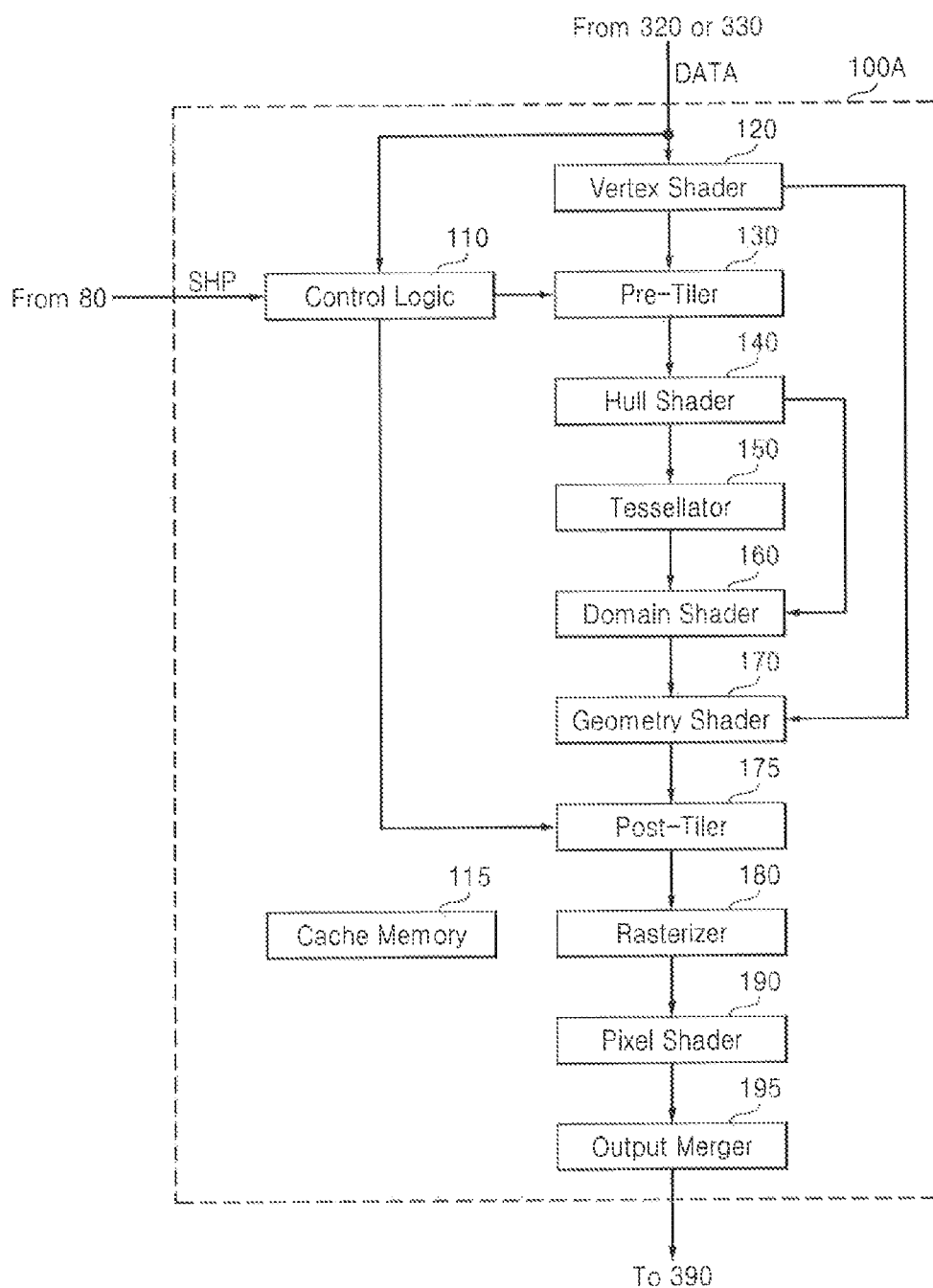
FIG. 3 is a block diagram of an exemplary implementation of the GPU shown in the data processing system of FIG. 1.

FIG. 3 is a block diagram of an exemplary implementation 100A of the GPU 100 shown in the data processing system of FIG. 1. Referring to FIGS. 1 through 3, the GPU 100A is configured to receive data from the CPU 60 and/or data from the memory 300 via the memory interface 95 and transmits data processed by the GPU 100A to the memory 300. For convenience' sake in the description, the CPU 60 and the memory interface 95 are omitted in FIG. 3.

The GPU 100A determines whether to perform a tiling operation before or after a tessellation operation based on input data DATA received from the memory 300 and then performs the tiling operation according to the determination result.

The GPU 100A includes a control logic 110, a cache memory 115, a vertex shader 120, a pre-tiler 130, a hull shader 140, a tessellator 150, a domain shader 160, a geometry shader 170, a post-tiler 175, a rasterizer 180, a pixel shader 190, and an output merger 195.

Here, the tessellation operation is an operation of generating primitives for the rendering of an image of an object. The tessellation operation can be a series of operations performed by the huh shader 140, the tessellator 150, and the domain shader 160.

The control logic 110 controls the overall operation of the GPU 100A. For instance, the control logic 110 controls the operation of the components 115, 120, 130, 140, 150, 160, 170, 175, 180, 190, and 195. Each of the components 120, 130, 140, 150, 160, 170, 175, 180, 190, and 195 can be a unit that executes a program instruction (or a shading program) SHP, which is related with graphics processing and is output from the RAM 80, according to the control of the control logic 110. The unit can be implemented as a hardware component or a software component.

For instance, the program instruction SHP may include a vertex shader program instruction, a tiler program instruction, a hull shader program instruction, a tessellator program instruction, a domain shader program instruction, a geometry shader program instruction, a rasterizer program instruction, a pixel shader program instruction, and/or an output merger program instruction.

The control logic 110 controls the order of the tessellation operation and the tiling operation, based on the input data DATA received from the memory 300. For instance, the control logic 110 determines whether the tiling operation will be performed before or after the tessellation operation based on the input data DATA received from the vertex buffer 320 and controls the tiling operation of the pre-tiler 130 and the tiling operation of the post-tiler 175 according to the determination result.

In addition, the control logic 110 determines whether the tiling operation will be performed before or after the tessellation operation based on the input data DATA received from the vertex buffer 320 and a rendering state received from the CPU 60 and controls the tiling operation of the pre-tiler 130 and the tiling operation of the post-tiler 175 based on the determination result. For instance, the rendering state may include the program instruction SHP.

When the input data DATA is not a patch, for example when the input data DATA is a primitive or a vertex, the control logic 110 controls the post-tiler 175 to perform the tiling operation after the tessellation operation. At this time, the control logic 110 also controls the vertex shader 120 to process the primitive or the vertex and to output processed data to the geometry shader 170. When the input data DATA is not a patch, for example when the input data DATA is a primitive or a vertex, the primitive or the vertex will not be tessellated by the tessellation operation.

When the input data DATA is patch data, e.g., a patch, output from the vertex buffer 320, the control logic 110 determines whether the tiling operation will be performed before or after the tessellation operation, based on the patch and controls each of the tiling operations of the pre-tiler 130 and the tiling operation of the post-tiler 175 according to the determination result.

Figure 4:
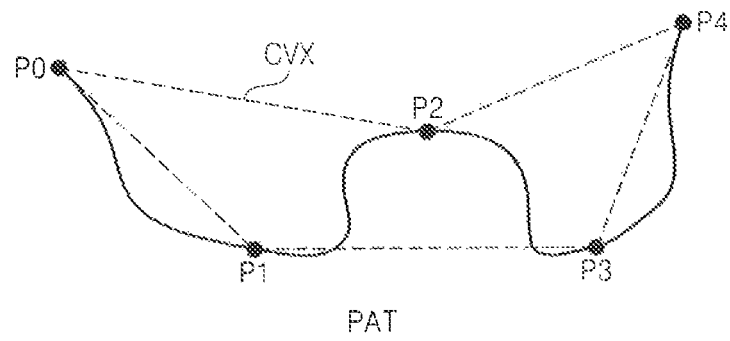
FIGS. 4 through 6 are conceptual diagrams for explaining a method of a control logic illustrated in FIG. 3 determining the order of a tessellation operation and a tiling operation when input data is a patch.
Figure 5:
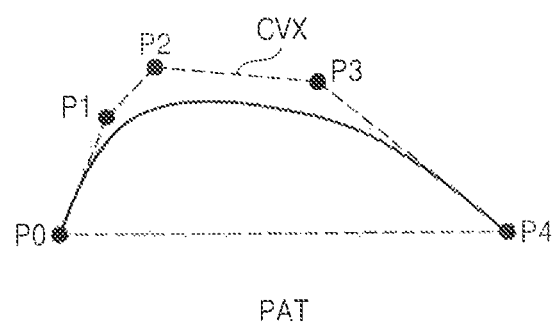
Figure 6:
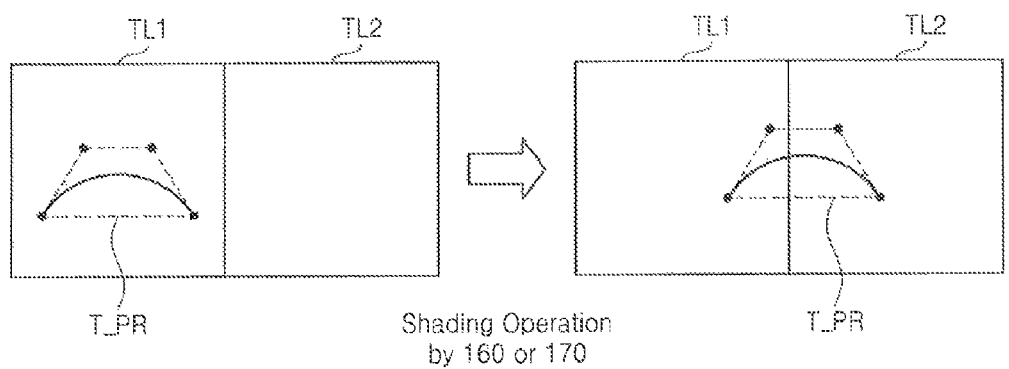

FIGS. 4 through 6 are conceptual diagrams for explaining a method of the control logic 110 illustrated in FIG. 3 determining the order of a tessellation operation and a tiling operation when the input data DATA is a patch.

FIG. 4 is a diagram illustrating a patch PAT (P) out-side of a convex hull CVX. Referring to FIGS. 1 through 4, when the geometry of a patch PAT is at the out-side of a convex hull CVX defined by control points P0 through P4 of the patch P, the control logic 110 controls the post-tiler 175 to perform the tiling operation after the tessellation operation.

Since it is difficult to assign a bounding box based on the convex hull CVX to the patch PAT when the geometry of the patch PAT is at the out-side of the convex hull CVX defined by the control points P0 through P4 of the patch P, it is efficient that the post-tiler 175 performs the tiling operation after the tessellation operation.

FIG. 5 is a diagram illustrating a patch PAT (P) at the in-side of the convex hull CVX and involved in a shading operation.

Referring to FIGS. 1 through 3 and FIGS. 5 and 6, when the geometry of a tessellated primitive T_PR corresponding to the patch PAT changes based on a shading operation, the control logic 110 controls the post-tiler 175 to perform the tiling operation after the tessellation operation. For instance, the shading operation may be an operation, e.g., a transformation-related operation, performed by the domain shader 160 or the geometry shader 170.

As shown in FIGS. 5 and 6, the geometry of the patch PAT may be at the in-side of the convex hull CVX defined by the control points P0 through P4 of the patch P, but the geometry, e.g., the shape and/or position, of the tessellated primitive T_PR corresponding to the patch PAT may be changed according to the shading operation. For instance, the tessellated primitive T_PR corresponding to the patch PAT, which has been included in a tile TL1 by the tiling operation performed before the tessellation operation, may be included in a tile TL2 different from the tile TL1 by the shading operation.

In other words, since the geometry, e.g., the shape and/or position, of the tessellated primitive T_PR corresponding to the patch PAT may be changed according to the shading operation, it is efficient that the post-tiler 175 performs the tiling operation not before but after the tessellation operation.

When the geometry of the patch PAT is preserved, for example, when the geometry of the patch PAT is at the in-side of the convex hull CVX defined by the control points P0 through P4 and the geometry of the tessellated primitive T_PR corresponding to the patch PAT is not changed by the shading operation, the control logic 110 controls the pre-tiler 130 to perform the tiling operation before the tessellation operation. For instance, the patch PAT lying within the convex hull CVX may be a Bezier patch or an approximating curve (or an approximating surface).

The vertex shader 120 is configured to receive, as the input data DATA, vertex data (e.g., a vertex or a primitive) or patch data (e.g., a patch) from the vertex buffer 320. The vertex shader 120 processes the input data DATA. For instance, the vertex shader 120 processes the input data DATA using an operation such as transformation, morphing, skinning, or lighting.

The vertex shader 120 outputs the processed data to the pre-tiler 130 or to the geometry shader 170. For instance, when the input data DATA is not the patch data, (i.e., when the input data DATA is the vertex data), the vertex shader 120 processes the vertex data and outputs the processed vertex data to the geometry shader 170. When the input data DATA is the patch data, the vertex shader 120 processes the patch data and outputs the processed patch data to the pre-tiler 130.

According to the control of the control logic 110, the pre-tiler 130 tiles the processed patch data received from the vertex shader 120 and outputs the tiled patch data to the hull shader 140.

For instance, the pre-tiler 130 projects patches corresponding to respective processed patch data onto a virtual space corresponding to the display 200, performs tile binning in the virtual space based on bounding boxes assigned to the respective patches, and makes a list matching each tile with an index of a patch included in the tile.

The pre-tiler 130 stores the list in the list buffer 340. The pre-tiler 130 uploads the list to the cache memory 115 and sequentially reads patch data of each of the patches included in the respective tiles from memory 300 based on the uploaded list and outputs the patch data to the hull shader 140.

In other words, the pre-tiler 130 can tile the patches before the tessellation operation, read patch data only corresponding to a patch to be tessellated according to the tiling result, and output the patch data to the hull shader 140. Accordingly, since only patch data corresponding to the patch to be tessellated is transmitted from the memory 300 to the GPU 100A for the tessellation operation, the GPU 100A reduces the increase of data bandwidth. In addition, the GPU 100A reads only patch data corresponding to the patch to be tessellated, thereby reducing power consumption during a data read operation.

The processed patch data output from the vertex shader 120 may be controlled by the control logic 110 to bypass the pre-tiler 130.

The hull shader 140 receives the processed patch data output from the vertex shader 120 or the tiled patch data output from the pre-tiler 130 and determines a tessellation factor for the patch corresponding to the received data. For instance, the tessellation factor may be the level of detail (LOD) of the patch corresponding to the received data.

The hull shader 140 outputs the tessellation factor to the tessellator 150. The hull shader 140 also outputs control points included in the received data, a parametric equation, and the tessellation factor to the domain shader 160. The tessellator 150 tessellates tessellation domain coordinates based on the tessellation factor(s) determined by the hull shader 140. For instance, the tessellation domain coordinates may be defined as (u, v) or (u, v, w). The tessellator 150 outputs the tessellated domain coordinates to the domain shader 160.

The domain shader 160 calculates spatial coordinates of the patch corresponding to the tessellated domain coordinates based on the tessellation factor(s) and the parametric equation. For instance, the spatial coordinates may be defined as (x, y, z). The domain shader 160 generates primitives such as dots, lines, and triangles using the calculated spatial coordinates and outputs the primitives to the geometry shader 170.

The primitives generated through a series of operations, i.e., the tessellation operations performed by the hull shade 140, the tessellator 150, and the domain shader 160 includes tessellated vertices. Vertex data about the tessellated vertices may be stored as tessellated vertex data in the vertex buffer 320.

The geometry shader 170 generates new primitives by adding or removing vertices adjacent to the primitives output from the domain shader 160. In addition, the geometry shader 170 generated new primitives by adding or removing vertices adjacent to the vertex (or the primitive) output from the vertex shader 120. The geometry shader 170 outputs the new primitives to the post-tiler 175.

The post-tiler 175 tiles the new primitives received from the geometry shader 170 and outputs the tiled primitives to the rasterizer 180 under the control of the control logic 110. The tiling operation of the post-tiler 175 is substantially the same as that of the pre-tiler 130. The new primitives output from the geometry shader 170 are controlled by the control logic 110 to bypass the post-tiler 175.

The rasterizer 180 converts the new primitives output from the geometry shader 170 or the tiled primitives output from the post-tiler 175 into a plurality of pixels. The pixel shader 190 processes the effect of the pixels. For instance, the effect may be the color of the pixels or the light and shade of the pixels.

In various embodiments, the pixel shader 190 can perform computation operations to process the effect of the pixels. The computation operations may include texture mapping and color format conversion. The texture mapping may be an operation of mapping a plurality of texels output from the texture buffer 360 to add details to a plurality of pixels. The color format conversion may be an operation of converting a plurality of pixels into an RGB format, a YUV format, or a YCoCg format.

The output merger 195 confirms (or determine) final pixels to be displayed on the display 200 among the processed pixels using information about previous pixels and generates color of the final pixels. For instance, the information about the previous pixels includes depth information, stencil information, and color information.

For instance, the output merger 195 performs a depth test on the processed pixels based on the depth information for depth data) received from the depth/stencil buffer 370 and confirms for determines) the final pixels according the test result.

The output merger 195 also performs a stencil test on the processed pixels based on the stencil information (or stencil data) received from the depth/stencil buffer 370 and confirms (or determines) the final pixels according the test result. In addition, the output merger 195 blends the final pixels using color data received from the color buffer 380. The output merger 195 outputs pixel data (or image data) about the final pixels to the frame buffer 390.

The pixel data may be stored in the frame buffer 380 and can be display on the display 200 through the display controller 90.

Figure 7:
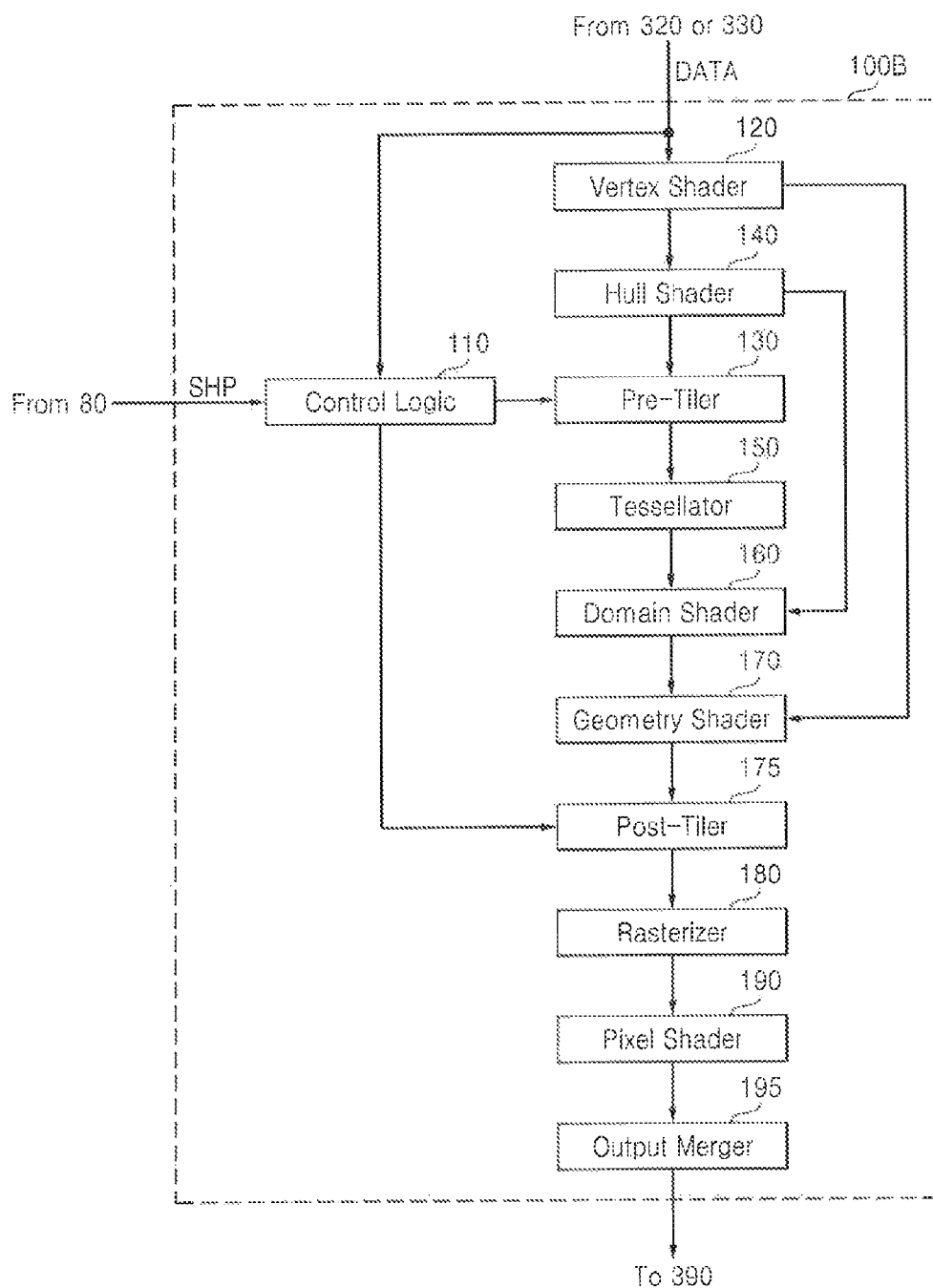
FIG. 7 is a block diagram of an exemplary implementation of the GPU of FIG. 1.

FIG. 7 is a block diagram of an exemplary implementation 100B of the GPU 100 shown in the data processing system of FIG. 1. Referring to FIG. 7, the CPU 100B includes a control logic 110, a vertex shader 120, a pre-tiler 130, a hull shader 140, a tessellator 150, a domain shader 160, a geometry shader 170, a post-tiler 175, a rasterizer 180, a pixel shader 190, and an output merger 195.

The GPU 100B may also include the cache memory 115. Except for the position of the pre-tiler 130, the structure and operations of the components 110 through 195 of the GPU 100B are substantially the same as those of the components 110 through 195 of the GPU 100A illustrated in FIG. 3. While the pre-tiler 130 is positioned (operatively connected) between the vertex shader 120 and the hull shader 140 in the GPU 100A, the pre-tiler 130 in the GPU 100B is positioned between the hull shader 140 and the tessellator 150.

Figure 8:
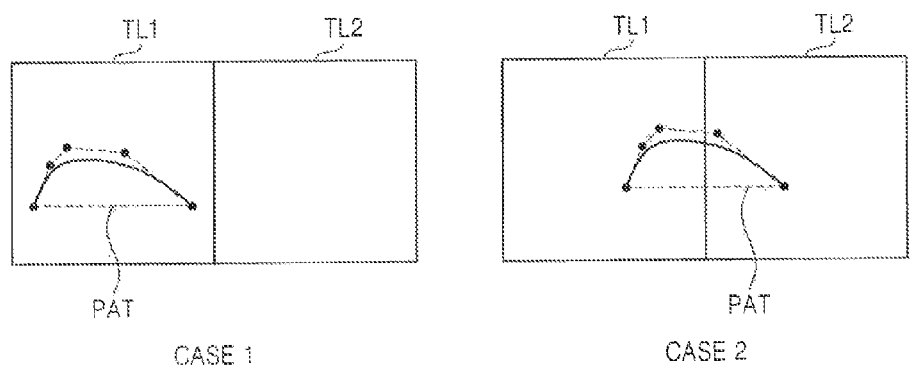
FIG. 8 is a conceptual diagram for explaining the operation of the GPU of FIG. 7.

FIG. 8 is a conceptual diagram for explaining the operation of the GPU 100B of FIG. 7. Referring to FIGS. 7 and 8, the patch PAT is tiled by the pre-tiler 130 of the GPU 100B of FIG. 7. At this time, the patch PAT may be included in one single tile TL1 (CASE1) or spanning a plurality of tiles TL1 and TL2 (CASE2).

When the patch PAT tiled by the pre-tiler 130 positioned between the vertex shader 120 and the hull shader 140, as shown in FIG. 3, is spanning a plurality of the tiles TL1 and TL2, the hull shader 140 needs to determine a plurality of tessellation factors for the patch PAT with respect to the respective tiles TL1 and TL2. However, when the pre-tiler 130 is positioned between the hull shader 140 and the tessellator 150, as shown in FIG. 7, the hull shader 140 needs to determine only one tessellation factor for the patch PAT.

Figure 9:
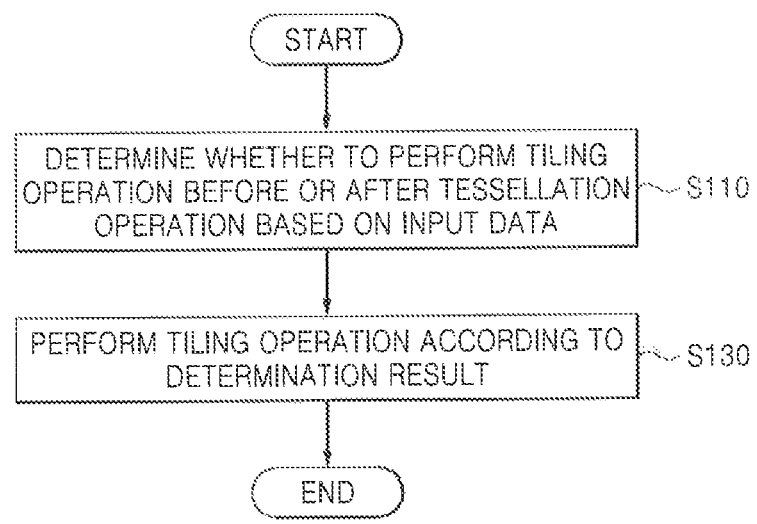
FIG. 9 is a flowchart of a method of operating a GPU according to some embodiments of the inventive concept.

FIG. 9 is a flowchart of a method of operating the GPU 100A or the GPU 100B (collectively denoted by 100) according to some embodiments of the inventive concept. Referring to FIG. 9, the GPU 100 determines whether to perform a tiling operation before or after a tessellation operation, based on the input data DATA in step S110. The GPU 100 performs the tiling operation based on the determination result in step S130.

As described above, according to some embodiments of the inventive concept, a GPU controls the order of a tessellation operation and a tiling operation based on input data so that it performs the tiling operation before the tessellation operation and reads and writes data only corresponding to input data to be tessellated according to the tiling result, thereby preventing the waste of data bandwidth. In addition, since the GPU reads and writes the data only corresponding to the input data to be tessellated, it also reduces power consumption when reading the data.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A graphics processing unit (GPU) configured to perform a tiling operation and a tessellation operation, comprising:
   a pre-tiler configured to perform the tiling operation before the tessellation operation;
   a post-tiler configured to perform the tiling operation after the tessellation operation; and
   a control logic configured to control, based on input data, whether the pre-tiler or the post tiler performs the tiling operation,
   wherein the control logic controls the post-tiler to perform the tiling operation after the tessellation operation if the input data does not correspond to a first patch, wherein the control logic control the post-tiler to perform the tiling operation after the tessellation operation if a geometry of a second patch is at the outside of a convex hull defined by control points of the second patch, and wherein the control logic controls the post-tiler to perform the tiling operation after the tessellation operation if a geometry of a tessellated primitive corresponding to a third patch changes according to a shading operation, wherein the control logic is a circuit.

2. The graphics processing unit (GPU) of claim 1,
wherein the control logic controls the pre-tiler to perform the tiling operation before the tessellation operation if the input data corresponds to the first patch,
and if the geometry of the second patch is at the in-side of the convex hull, and if the geometry of the tessellated primitive corresponding to the third patch is not changed by the shading operation.

3. The graphics processing unit (GPU) of claim 1, further comprising a hull shader, a vertex shader; and a tessellator, wherein the pre-tiler is operatively connected between the vertex shader and the hull shader.

4. The graphics processing unit (GPU) of claim 1, further comprising a hull shader, a vertex shader; and a tessellator, wherein the pre-tiler is operatively connected between the hull shader and the tessellator.

5. An application processor comprising:
a graphics processing unit (GPU) configured to perform a tiling operation and a tessellation operation; and
a memory interface configured to transmit the input data from a memory to the graphics processing unit (GPU),
wherein the memory interface and the graphics processing unit are embedded in an application processor,
wherein the graphics processing unit (GPU) including:
a pre-tiler configured to perform the tiling operation before the tessellation operation;
a post-tiler configured to perform the tiling operation after the tessellation operation; and
a control logic configured to control, based on input data, whether the pre-tiler or the post tiler performs the tiling operation,
wherein the control logic controls the post-tiler to perform the tiling operation after the tessellation operation if the input data is not a first patch,
wherein the control logic controls the post-tiler to perform the tiling operation after the tessellation operation if a geometry of a second patch is at the outside of a convex hull defined by control points of the second patch, and
wherein the control logic controls the post-tiler to perform the tiling operation after the tessellation operation if a geometry of a tessellated primitive corresponding to a third patch changes according to a shading operation,
wherein the control logic is a circuit.

6. The application processor of claim 5,
wherein the control logic controls the pre-tiler to perform the tiling operation before the tessellation operation if the input data is the first patch, and if the geometry of the second patch is at the in-side of the convex hull, and it the geometry of the tessellated primitive corresponding to the third patch is not changed by the shading operation.

7. The application processor of claim 5, further comprising a geometry shader and rasterizer, wherein the post-tiler is operatively connected between the geometry shader and the rasterizer.

8. The application processor of claim 5, further comprising a hull shader, a vertex shader; and a tessellator, wherein the pre-tiler is operatively connected between the vertex shader and the hull shader.

9. The application processor of claim 5, further comprising a hull shader, a vertex shader; and a tessellator, Wherein the pre-tiler is operatively connected between the hull shader and the tessellator.

10. A system on chip (SoC) comprising:
a graphics processing unit (GPU) configured to perform a tiling operation and a tessellation operation;
a memory configured to store the input data; and
a memory interface configured to transmit the input data from the memory to the graphics processing unit (GIFU),
wherein the graphics processing unit (GPU) including:
a pre-tiler configured to perform the tiling operation before the tessellation operation;
a post-tiler configured to perform the tiling operation after the tessellation operation; and
a control logic configured to control, based on input data, whether the pre-tiler or the post tiler performs the tiling operation,
wherein the control logic controls the post-tiler to perform the tiling operation after the tessellation operation if the input data is not a first patch, and
wherein the control logic controls the post-tiler to perform the tiling operation after the tessellation operation if a geometry of a second patch is at the outside of a convex hull defined by control points of the second patch, and
wherein the control logic controls the post-tiler to perform the tiling operation after the tessellation operation if a geometry of a tessellated primitive corresponding to a third patch changes according to a shading operation,
wherein the control logic is a circuit.

11. The SoC of claim 10,
wherein the control logic controls the pre-tiler to perform the tiling operation before the tessellation operation if the input data is the first patch, and if the geometry of the second patch is at the in-side of the convex hull, and if the geometry of the tessellated primitive corresponding to the third patch is preserved.

12. The SoC of claim 11, further comprising a bull shader, a vertex shader; and a tessellator, wherein the pre-tiler is operatively connected between the vertex shader and the hall shader.

13. The SoC of claim 11, further comprising a hull shakier, a vertex shader; and as tessellator, wherein the pre-tiler is operatively connected between the hull shader and the tessellator.

14. A graphics processing unit (GPU) configured to perform a tiling operation, and a tessellation operation, comprising:
a control logic circuit configured to control, based on input data, whether a pre-tiler or a post tiler performs the tiling operation,
wherein the control logic circuit controls the post-tiler to perform the tiling operation after the tessellation operation if the input data does not include a first patch,
wherein the control logic circuit controls the post-tiler to perform the tiling operation after the tessellation operation if a geometry of a second patch is at the out-side of a convex hull defined by control points of the second patch, and
wherein the control logic circuit controls the post-tiler to perform the tiling operation after the tessellation operation if a geometry of a tessellated primitive corresponding to a third patch changes according to a shading operation.

15. The graphics processing unit (CPU) of claim 14, further comprising:
the pre-tiler configured to perform the tiling operation before the tessellation operation;
the post-tiler configured to perform the tiling operation after the tessellation operation;
a hull shader;
a vertex shader; and
a tessellator.

16. The graphics processing unit (GPU) of claim 15, wherein the pre-tiler is operatively connected between the vertex shader and the hull shader.

17. The graphics processing unit (GPU) of claim 15, wherein the pre-tiler is operatively connected between the hull shader and the tessellator.

* * * * *